(12) United States Patent
Huang et al.

(10) Patent No.: US 12,335,291 B2
(45) Date of Patent: Jun. 17, 2025

(54) INFORMATION LEAKAGE DETECTION METHOD AND DEVICE USING THE SAME

(71) Applicant: Acer Cyber Security Incorporated, Taipei (TW)

(72) Inventors: Chiung-Ying Huang, Taipei (TW); Huei-Tang Li, Taipei (TW); Yi-Chung Tseng, Taipei (TW); Wei-An Chen, Taipei (TW)

(73) Assignee: Acer Cyber Security Incorporated, Taipei (TW)

( * ) Notice: Subject to any disclaimer, the term of this patent is extended or adjusted under 35 U.S.C. 154(b) by 280 days.

(21) Appl. No.: 17/834,943

(22) Filed: Jun. 8, 2022

(65) Prior Publication Data
US 2022/0400133 A1  Dec. 15, 2022

(30) Foreign Application Priority Data
Jun. 11, 2021 (TW) ................................. 110121326

(51) Int. Cl.
*H04L 9/40* (2022.01)
*G06N 20/00* (2019.01)

(52) U.S. Cl.
CPC ......... *H04L 63/1433* (2013.01); *G06N 20/00* (2019.01); *H04L 63/1416* (2013.01); *H04L 63/1425* (2013.01); *H04L 63/1475* (2013.01)

(58) Field of Classification Search
CPC . H04L 63/14; H04L 63/1408; H04L 63/1416; H04L 63/1425; H04L 63/1441; H04L 63/1466; H04L 61/4511
See application file for complete search history.

(56) References Cited

U.S. PATENT DOCUMENTS 10,498,751 B2 * 12/2019 Yu ........................ H04L 63/1416
11,095,666 B1 *  8/2021 Li ......................... H04L 63/145
(Continued)

FOREIGN PATENT DOCUMENTS

| CN | 106713303 | 5/2017 |
| CN | 107786575 | 3/2018 |

(Continued)

OTHER PUBLICATIONS

Yadav et al., "Detecting Algorithmically Generated Domain-Flux Attacks With DNS Traffic Analysis" [Online], Feb. 10, 2012 [ Retrieved on: May 3, 2024], www.ieee.org, Retrieved from: < https://ieeexplore.ieee.org/stamp/stamp.jsp?tp=&arnumber=6151233> (Year: 2012).*

(Continued)

*Primary Examiner* — Eric W Shepperd
(74) *Attorney, Agent, or Firm* — JCIPRNET

(57) ABSTRACT

An information leakage detection method and a device using the same are disclosed. The method includes the following steps. Network connection data of an electronic device is obtained. Log data related to a (domain name system) DNS is extracted from the network connection data. A DNS request in the log data is analyzed to obtain multiple character distribution feature values according to an analysis result. The character distribution feature values reflect a character distribution status of a domain name in the DNS request under different classification rules. A machine learning model determines whether the DNS request is a malicious DNS request according to the character distribution feature values, and the malicious DNS request is used to carry leaked data to a remote host.

6 Claims, 3 Drawing Sheets

(56) References Cited

U.S. PATENT DOCUMENTS

| | | | | |
|---|---|---|---|---|
| 2011/0302656 | A1* | 12/2011 | El-Moussa | H04L 63/1416 726/24 |
| 2016/0065597 | A1 | 3/2016 | Nguyen et al. | |
| 2016/0099961 | A1* | 4/2016 | Paugh | H04L 63/1425 726/23 |
| 2016/0337391 | A1* | 11/2016 | McKinney | H04L 63/1416 |
| 2018/0063162 | A1* | 3/2018 | Baughman | H04L 63/1416 |
| 2018/0077117 | A1* | 3/2018 | Hagen | H04L 63/0236 |
| 2018/0109494 | A1* | 4/2018 | Yu | H04L 63/1441 |
| 2018/0351972 | A1* | 12/2018 | Yu | H04L 63/1416 |
| 2019/0012456 | A1 | 1/2019 | Moore et al. | |
| 2019/0081958 | A1* | 3/2019 | Lee | H04L 63/145 |
| 2019/0089721 | A1* | 3/2019 | Pereira | G06F 16/951 |
| 2019/0130100 | A1* | 5/2019 | Dymshits | G06F 16/90335 |
| 2019/0222589 | A1 | 7/2019 | Kislitsin | |
| 2020/0045077 | A1* | 2/2020 | Chiba | H04L 63/1466 |
| 2020/0220897 | A1* | 7/2020 | Lin | G06F 17/16 |
| 2021/0006593 | A1* | 1/2021 | Schnieders | G06V 30/245 |
| 2021/0126901 | A1 | 4/2021 | Rodriguez et al. | |
| 2021/0400061 | A1* | 12/2021 | Antoniewicz | H04L 61/4511 |
| 2022/0210170 | A1* | 6/2022 | Di Pinto | H04L 63/1441 |

FOREIGN PATENT DOCUMENTS

| | | |
|---|---|---|
| CN | 107835149 | 3/2018 |
| CN | 108206814 | 6/2018 |
| CN | 108449349 | 8/2018 |
| CN | 110166422 | 8/2019 |
| CN | 110324273 | 10/2019 |
| CN | 110581850 | 12/2019 |
| CN | 112134829 | 12/2020 |

OTHER PUBLICATIONS

Yu et al., "Character Level based Detection of DGA Domain Names" [Online], Oct. 14, 2018 [Retrieved on: May 3, 2024], www.ieee.org, Retrieved from: < https://ieeexplore.ieee.org/stamp/stamp.jsp?tp=&arnumber=8489147 > (Year: 2018).*

Antonakakis et al., "From Throw-Away Traffic to Bots: Detecting the Rise of DGA-Based Malware" [Online], [Retrieved on: May 3, 2024], Usenix Security Symposium, vol. 12, 2012, Retrieved from: < https://www.usenix.org/system/files/conference/usenixsecurity12/sec12-final127.pdf > (Year: 2012).*

Schiavoni et al., "Phoenix: DGA-Based Botnet Tracking and Intelligence" [Online], [Retrieved on: May 3, 2024], Conf. on Detection of Intrusions&Malware, &Vulnerability Assessment, 2014, pp. 192-211, Retrieved from: < https://seclab.cs.ucsb.edu/files/publications/Schiavoni2014Phoenix_DGA-Based.pdf > (Year: 2014).*

Li; Jian-Fei et al., "Research on Irregular Domain Name Detection Based on Text and DNS Querying", Computer Technology and Development, Nov. 7, 2019, pp. 114-120, vol. 30, No. 2.

Yu; Guangxi et al., "Design and Implementation of a DGA Domain Name Detection System by Machine Learning", Journal of Cyber Security, Apr. 27, 2020, pp. 35-47, vol. 5, No. 3.

Aastha Chowdhary et al, "DNS Tunneling Detection using Machine Learning and Cache Miss Properties", 2021 5th International Conference on Intelligent Computing and Control Systems (ICICCS), May 6, 2021, pp. 1225-1229.

Jawad Ahmed et al, "Monitoring Enterprise DNS Queries for Detecting Data Exfiltration From Internal Hosts", IEEE Transactions on Network and Service Management, vol. 17, No. 1, Sep. 10, 2019, pp. 265-279.

Jiacheng Zhang et al, "A DNS Tunneling Detection Method Based on Deep Learning Models to Prevent Data Exfiltration", arxiv.org, Cornell University Library, 201 Olin Library Cornell University Ithaca, NY, Dec. 10, 2019, pp. 520-535.

* cited by examiner

INFORMATION LEAKAGE DETECTION METHOD AND DEVICE USING THE SAME

CROSS-REFERENCE TO RELATED APPLICATION

This application claims the priority benefit of Taiwan application serial no. 110121326, filed on Jun. 11, 2021. The entirety of the above-mentioned patent application is hereby incorporated by reference herein and made a part of this specification.

BACKGROUND

Technical Field

The disclosure relates to an information leakage detection technology, and more particularly to an information leakage detection method and a device using the same.

Description of Related Art

A domain name system (DNS) is an Internet service, which may be used as a distributed database mapping domain names and Internet protocol (IP) addresses to each other to provide people with easier access to the Internet. For example, when a terminal device needs to open a web page using a certain domain name, the terminal device may send a DNS request to a responsible DNS server. After receiving the DNS request, the DNS server may resolve the DNS request and send a DNS response to the terminal device, so as to inform the terminal device of an IP address corresponding to the domain name through the domain name system response.

Generally speaking, most network security systems (such as firewalls) do not block DNS requests and DNS responses to avoid affecting normal network connection of terminal devices. However, due to this fact, once a hacker or a malicious program sends a DNS request for information leakage, such as carrying and sending sensitive data of a terminal device in the DNS request to a remote host, most network security systems may not be able to detect or prevent such information leakage.

SUMMARY

The disclosure provides an information leakage detection method and a device using the same, which may improve efficiency of detecting a domain name system (DNS) request and/or a domain name used by a hacker or a malicious program for information leakage.

An embodiment of the disclosure provides an information leakage detection method, including the following steps. Network connection data of an electronic device is obtained. Log data related to a DNS is extracted from the network connection data. A DNS request in the log data is analyzed to obtain multiple character distribution feature values according to an analysis result. The character distribution feature values reflect a character distribution status of a domain name in the DNS request under different classification rules. A machine learning model determines whether the DNS request is a malicious DNS request according to the character distribution feature values, and the malicious DNS request is used to carry leaked data to a remote host.

An embodiment of the disclosure further provides an information leakage detection device, including a storage circuit and a processor. The storage circuit is configured to store network connection data and a machine learning model of an electronic device. The processor is coupled to the storage circuit and is configured to perform the following operations. Log data related to a DNS is extracted from the network connection data. A DNS request in the log data is analyzed to obtain multiple character distribution feature values according to an analysis result. The character distribution feature values reflect a character distribution status of a domain name in the DNS request under different classification rules. The machine learning model determines whether the DNS request is a malicious DNS request according to the character distribution feature values, and the malicious DNS request is used to carry leaked data to a remote host.

Based on the above, after the network connection data of the electronic device is obtained, the log data related to the DNS may be extracted from the network connection data. Next, the DNS request in the log data may be analyzed to obtain the character distribution feature values according to the analysis result, and the character distribution feature values reflect the character distribution status of the domain name in the DNS request under different classification rules. In following, the machine learning model determines whether the DNS request is the malicious DNS request according to the character distribution feature values, and the malicious DNS request is used to carry the leaked data to the remote host. In this way, the efficiency of detecting a DNS request and/or a domain name used by a hacker or a malicious program for information leakage may be effectively improved.

DESCRIPTION OF THE EMBODIMENTS

Figure 1:
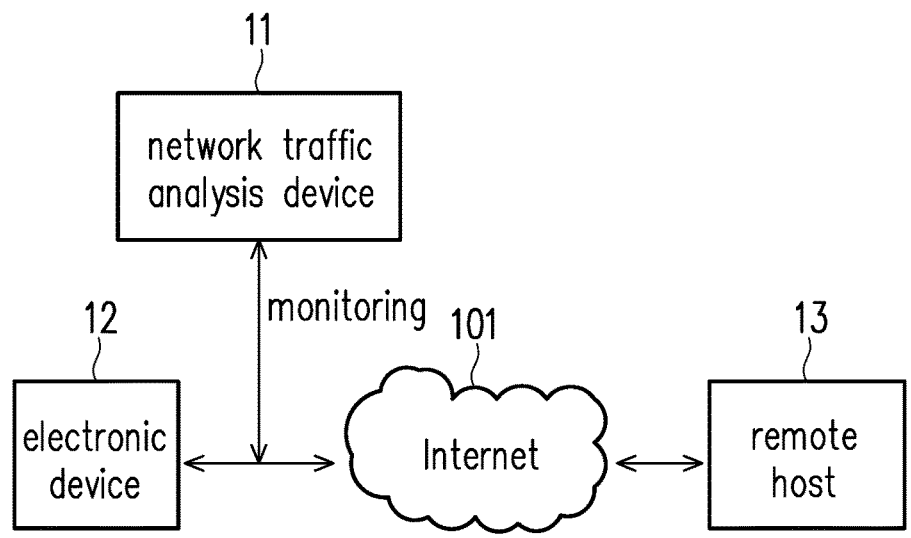
FIG. 1 is a schematic diagram of a domain name analysis system according to an embodiment of the disclosure.

FIG. 1 is a schematic diagram of a domain name analysis system according to an embodiment of the disclosure. With reference to FIG. 1, the domain name analysis system includes a network traffic analysis device (also referred to as an information leakage detection device) 11 and an electronic device 12. The electronic device 12 may be connected to a remote host 13 through an Internet 101. In particular, the electronic device 12 may be connected to the remote host 13 by one or more domain names. A domain name may be a string of characters separated by one or more dots (for example, www.google.com).

In an embodiment, the electronic device 12 is a terminal device. For example, the electronic device 12 may include a smartphone, a notebook computer, a desktop computer, an industrial computer, a server, a game console, or various electronic devices with networking functions. In addition, the remote host 13 may be a domain name server, such as a domain name server set up by a hacker.

In an embodiment, when the electronic device 12 is controlled by a hacker or a malicious program, the hacker or the malicious program may access sensitive data of the electronic device 12, such as user accounts, passwords, and/or fingerprint information. The hacker or the malicious program may encode this sensitive data to generate a string of meaningless data similar to garbled codes. Next, the hacker or the malicious program may generate a domain name system (DNS) request corresponding to the meaningless data. For example, the meaningless data may be carried in the domain name of the DNS request. For example, if the meaningless data generated by encoding is "fd12f3d1f23ds1f23sd1fsdf1," the generated DNS request may be "fd12f3d1f23ds1f23sd1fsdf1.XXXX.XX." Next, the hacker or the malicious program may control the electronic device 12 to send the DNS request to the remote host 13. For example, the DNS request is sent to the remote host 13 through port 53 of the electronic device 12. After receiving the DNS request, the remote host 13 may decode the domain name of the DNS request to restore the sensitive data originally in the electronic device 12, thereby serving the purpose of information leakage.

In an embodiment, the network traffic analysis device 11 may monitor network traffic of the electronic device 12. The network traffic analysis device 11 may use a machine learning model to detect whether the electronic device 12 executes information leakage by carrying sensitive data in a DNS request.

Figure 2:
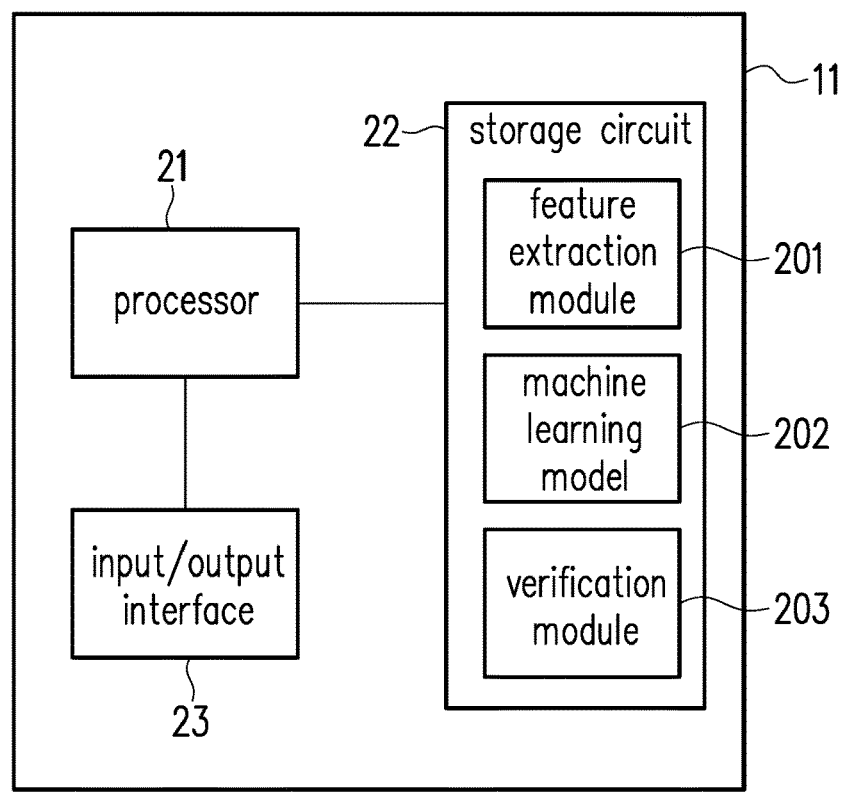
FIG. 2 is a schematic diagram of a network traffic analysis device according to an embodiment of the disclosure.

FIG. 2 is a schematic diagram of a network traffic analysis device according to an embodiment of the disclosure. With reference to FIG. 2, the network traffic analysis device 11 may include a processor 21, a storage circuit 22, and an input/output interface 23. The processor 21 is responsible for overall or partial operations of the network traffic analysis device 11. For example, the processor 21 may include a central processing unit (CPU) or other programmable general-purpose or special-purpose microprocessor, a digital signal processor (DSP), a programmable controller, an application specific integrated circuit (ASIC), a programmable logic device (PLD), or other similar device or a combination of these devices.

The storage circuit 22 is coupled to the processor 21 and is configured to store data. For example, the storage circuit 22 may include a volatile storage circuit and a non-volatile storage circuit. The volatile storage circuit is configured to store data in a volatile manner. For example, the volatile storage circuit may include a random access memory (RAM) or a similar volatile storage medium. The non-volatile storage circuit is configured to store data in a non-volatile manner. For example, the non-volatile storage circuit may include a read only memory (ROM), a solid state drive (SSD), and/or a traditional hard disk drive (HDD) or a similar non-volatile storage medium.

The input/output interface 23 is coupled to the processor 21 and is configured to execute signal input and output. For example, the input/output interface 23 may include various input/output devices such as a network interface card, a display, a mouse, a keyboard, a touch pad, a touch screen, a speaker, a microphone, and/or a power supply circuit. The disclosure does not limit the type of input/output devices.

In an embodiment, the storage circuit 22 stores a feature extraction module 201 and a machine learning model 202.

For example, the feature extraction module 201 and the machine learning model 202 may both be stored in the storage circuit 22 in the form of program codes. The processor 21 may run the feature extraction module 201 to execute logic operations such as feature value calculations. The machine learning model 202 may include a multi-decision tree model, such as an XGBoost model, or other types of machine learning models.

In an embodiment, the processor 21 may obtain network connection data of the electronic device 12. The processor 21 may store the network connection data in the storage circuit 22. For example, the network connection data of the electronic device 12 may be obtained by monitoring the network traffic of the electronic device 12 or reading network connection records of the electronic device 12.

In an embodiment, the processor 21 may extract log data related to a DNS from the network connection data. The processor 21 may analyze a certain DNS request in the log data by the feature extraction module 201 to obtain multiple character distribution feature values according to an analysis result. The character distribution feature values may reflect a character distribution status of a domain name in the DNS request under different classification rules. Next, the processor 21 may run the machine learning model 202 to determine whether the DNS request is a malicious DNS request according to the character distribution feature values. In particular, the malicious DNS request may be used to carry leaked data to a remote host (for example, the remote host 13 in FIG. 1).

Figure 3:
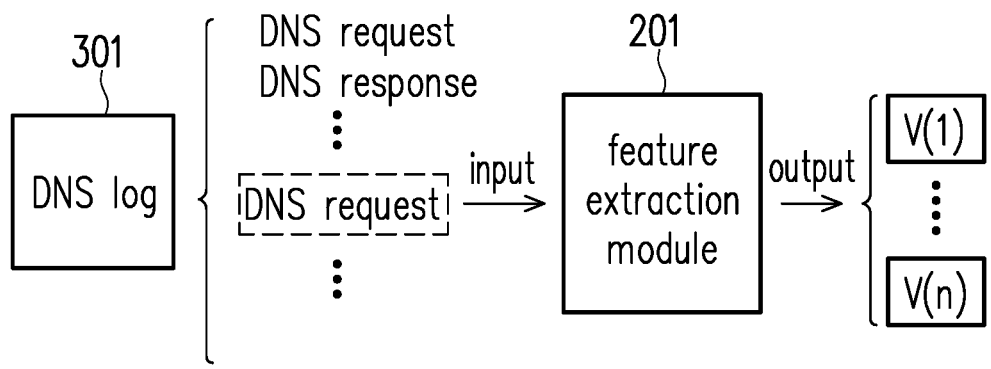
FIG. 3 is a schematic diagram of analyzing a DNS request to obtain multiple character distribution feature values according to an embodiment of the disclosure.

FIG. 3 is a schematic diagram of analyzing a DNS request to obtain multiple character distribution feature values according to an embodiment of the disclosure. With reference to FIG. 3, the processor 21 may extract log data related to a DNS (i.e., a DNS log 301) from network connection data. The processor 21 inputs a certain DNS request (also referred to as a target DNS request) in the DNS log 301 to the feature extraction module 201 for feature value calculations. The feature extraction module 201 may output multiple feature values $V(1)$ to $V(n)$ (i.e., the character distribution feature values) according to calculation results, where n may be any positive integer greater than 1.

In an embodiment, the character distribution feature values include various feature values. Taking a first type feature value and a second type feature value as examples, the first type feature value may reflect a character distribution status (also referred to as a first character distribution status) of a domain name (also referred to as a target domain name) in a target DNS request under a certain classification rule (also referred to as a first classification rule), and the second type feature value may reflect another character distribution status (also referred to as a second character distribution status) of the same target domain name under another classification rule (also referred to as a second classification rule). The first classification rule is different from the second classification rule. In an embodiment, the classification rule may also be regarded as a statistical rule or a logical rule. In an embodiment, by simultaneously (or parallel) analyzing the character distribution status of the target domain name in the target DNS request under different classification rules, detection efficiency (such as detection accuracy) of the malicious DNS request may be effectively improved.

In an embodiment, the feature extraction module 201 may analyze the target DNS request to obtain multiple evaluation parameters. For example, the evaluation parameters may reflect at least two among a total number of characters included in a meaningful string in the target domain name, a total number of all characters in the target domain name, a total number of numerals in the target domain name, a total number of non-repeated characters in a third-level domain name in the target domain name, a total number of all characters except a first-level domain name and a second-level domain name in the target domain name, a number of appearances of the character appearing most in the third-level domain name in the target domain name, a number of occurrences of numerals being adjacent to letters in the third-level domain name in the target domain name, a total number of characters meeting a specific condition in the third-level domain name in the target domain name, a total number of characters not meeting the specific condition in the third-level domain name in the target domain name, and an entropy value of the third-level domain name in the target domain name. Next, the feature extraction module 201 may obtain the character distribution feature values (i.e., the feature values V(1) to V(n) in FIG. 3) according to the evaluation parameters.

In an embodiment, the feature extraction module 201 may obtain the feature value V(1) according to the total number of characters included in a meaningful string in the target domain name and the total number of all characters in the target domain name. For example, the feature extraction module 201 may query whether the target domain name has a meaningful string according to a dictionary provided by an online platform (such as Google). For example, the feature extraction module 201 may obtain the feature value V(1) according to a ratio of the total number of characters included in a meaningful string in the target domain name to the total number of all characters in the target domain name. Taking "google.com" as an example, since "google" is a meaningful string and includes 6 characters, the feature extraction module 201 may obtain the feature value V(1) of 0.67 (i.e., 6/9). In other words, the feature value V(1) may reflect a proportion of characters included in a meaningful string in the target domain name among the entire target domain name.

In an embodiment, the feature extraction module 201 may obtain the feature value V(2) according to the total number of numerals in the target domain name and the total number of all characters in the target domain name. For example, the feature extraction module 201 may obtain the feature value V(2) according to a ratio of the total number of numerals in the target domain name to the total number of all characters in the target domain name. Taking "x123.com" as an example, there are 3 numerals, and the total length of the target domain name is 4 (for "x123") or 7 (for "x123.com"). Therefore, the feature extraction module 201 may obtain the feature value V(2) of 0.75 (i.e., 3/4) or 0.43 (i.e., 3/7). In other words, the feature value V(2) may reflect a proportion of numerals appearing among the target domain name.

In an embodiment, the feature extraction module 201 may obtain the feature value V(3) according to the total number of all characters in the target domain name. For example, if the total number of all characters in the target domain name is 9, the feature extraction module 201 may obtain the feature value V(3) of 9. In other words, the feature value V(3) may reflect the length of the target domain name.

In an embodiment, the feature extraction module 201 may obtain the feature value V(4) according to the total number of non-repeated characters in the third-level domain name in the target domain name. Taking "aabbcd11.google.com" as an example, the third-level domain name is "aabbcd11," and the non-repeated characters among "aabbcd11" are "a," "b," "c," "d," and "1." The feature extraction module 201 may obtain the feature value V(4) of 5 according to the total number of non-repeated characters in "aabbcd11" (i.e., 5). In other words, the feature value V(4) may reflect the total number of non-repeated characters in the third-level domain name in the target domain name.

In an embodiment, the feature extraction module 201 may obtain the feature value V(5) according to the total number of all characters except the first-level domain name and the second-level domain name in the target domain name. Taking "x111.google.com" as an example, the first-level domain name is "com," the second-level domain name is "google," and the third-level domain name is "x111." Therefore, the feature extraction module 201 may obtain the feature value V(5) of 4 according to the total number of all characters except the first-level domain name and the second-level domain name in the target domain name (i.e., the total number of all characters following the third-level domain name in the target domain name). For example, the length of "x111" is 4. In other words, the feature value V(5) may reflect the total number of all characters except the first-level domain name and the second-level domain name in the target domain name.

In an embodiment, the feature extraction module 201 may obtain the feature value V(6) according to the number of appearances of the character appearing most in the target domain name. Taking "ababaa.google.com" as an example, the third-level domain name is "ababaa," in which the character "a" repeats 4 times, and the character "b" repeats twice. Therefore, the feature extraction module 201 may obtain the feature value V(6) of 4 according to the character "a" repeating 4 times in the target domain name. In other words, the feature value V(6) may reflect the number of appearances of the character appearing most in the target domain name.

In an embodiment, the feature extraction module 201 may obtain the feature value V(7) according to the number of occurrences of numerals being adjacent to letters in the third-level domain name in the target domain name. Taking "c7e86e62.google.com" as an example, the third-level domain name is "c7e86e62," in which characters having numerals being adjacent to letters include "c7," "e8," and "6e." Therefore, the feature extraction module 201 may obtain the feature value V(7) of 3 according to three occurrences of numerals being adjacent to letters in the third-level domain name in the target domain name. In other words, the feature value V(7) may reflect the number of occurrences of numerals being adjacent to letters in the third-level domain name in the target domain name.

In an embodiment, the feature extraction module 201 may obtain the feature value V(8) according to the total number of characters meeting a specific condition in the third-level domain name in the target domain name. In an embodiment, characters meeting a specific condition may include multiple preset letters with the highest occurrence frequency and multiple preset letters with the lowest occurrence frequency. Taking the occurrence frequency of common letters counted by online platforms as an example, letters "e," "t," "a," "o," and "i" have the highest occurrence frequency, and letters "z," "q," "x," "j," and "k" have the lowest occurrence frequency. The feature extraction module 201 may obtain the feature value V(8) according to the total number of letters belonging to the letters with the highest occurrence frequency mentioned above and the total number of letters belonging to the letters with the lowest occurrence frequency mentioned above in the target domain name. Taking "knowledge.google.com" as an example, the third-level domain name is "knowledge," in which the total number of letters belonging to the letters with the highest occurrence frequency mentioned above is 3, including the letters "o,"

"e," and "e," and the total number of letters belonging to the letters with the lowest occurrence frequency mentioned above is 1, including the letter "k." Therefore, the feature extraction module 201 may obtain the feature value V(8) of 3 (i.e., 3/1) according to a ratio of the two total numbers. In other words, the feature value V(8) may reflect a ratio of characters appearing more frequently and characters appearing less frequently in the third-level domain name in the target domain name.

In an embodiment, the feature extraction module 201 may obtain the feature value V(9) according to the entropy value of the third-level domain name in the target domain name. Taking "a1f5b6hds.google.com" as an example, the third-level domain name is "a1f5b6hds." According to the entropy value (for example, 3.17) of "a1f5b6hds," the feature extraction module 201 may obtain the feature value V(9) of 3.17. In other words, the feature value V(9) may reflect the entropy value of the third-level domain name in the target domain name. In an embodiment, the entropy value may also be replaced by other values reflecting complexity or dispersion of multiple characters in the third-level domain name in the target domain name.

It should be noted that the above feature values V(1) to V(9) are only examples. In an embodiment, more other types of feature values in the feature values V(1) to V(n) may also be obtained by analyzing the target domain name according to different classification rules, statistical rules, or logical rules, and the disclosure is not limited thereto.

Figure 4:
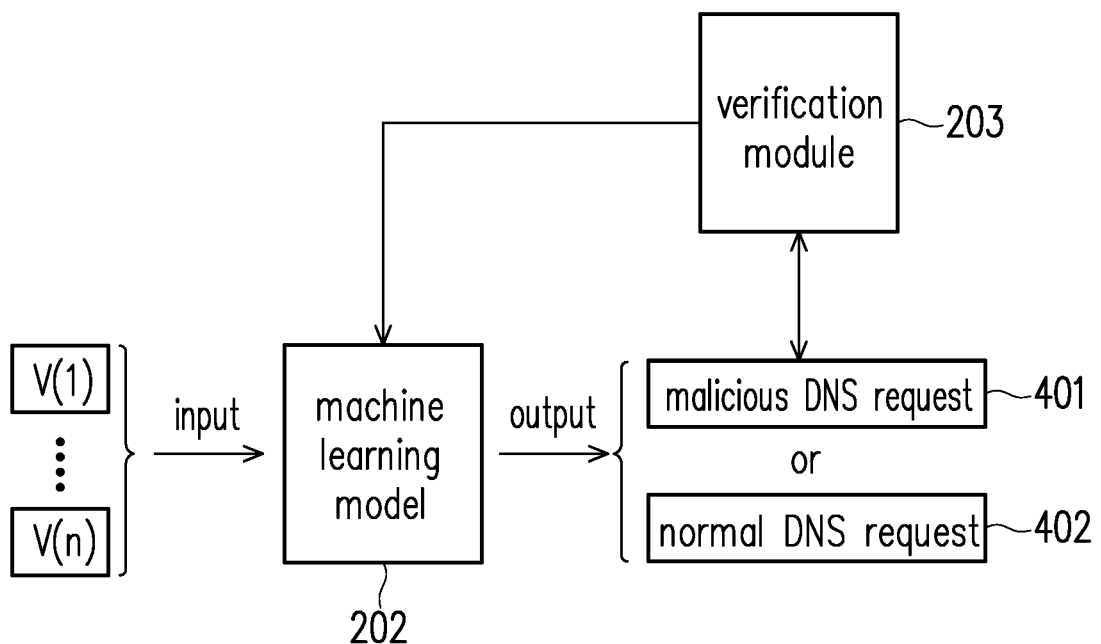
FIG. 4 is a schematic diagram of determining whether a domain name system request belongs to a malicious domain name system request based on multiple character distribution feature values according to an embodiment of the disclosure.

FIG. 4 is a schematic diagram of determining whether a DNS request is a malicious DNS request based on multiple character distribution feature values according to an embodiment of the disclosure. With reference to FIG. 4, in an embodiment, the processor 21 may input the feature values V(1) to V(n) to the machine learning model 202 for analysis. The machine learning model 202 may generate a determination result according to the feature values V(1) to V(n). This determination result may reflect that a target DNS request is a malicious DNS request 401 or a normal DNS request 402. It should be noted that since the feature values V(1) to V(n) cover various character distribution statuses of a target domain name under different classification rules, the detection efficiency (such as detection accuracy) of the machine learning model 202 determining whether the target DNS request is a malicious DNS request may be improved. For example, if the target domain name is "www.cht.com.tw," it is highly possible for the machine learning model 202 to determine this target domain name to be the normal DNS request 402. However, if the target domain name is "er41d6s7f89rtr2s.com.tw," it is highly possible for the machine learning model 202 to determine this target domain name to be the malicious DNS request 401. Among them, leaked sensitive data may be carried to a remote host through the third-level domain name in the target domain name (for example, "er41d6s7f89rtr2s"). In addition, during training, the machine learning model 202 may be trained by continuously using training data to improve the detection efficiency (such as detection accuracy) of the machine learning model 202 determining the malicious DNS request.

In the embodiment, the storage circuit 22 in FIG. 2 further stores a verification module 203. For example, the verification module 203 may be stored in the storage circuit 22 in the form of program codes. The processor 21 may verify a determination result of the machine learning model 202 by the verification module 203. For example, after the machine learning model 202 determines a target DNS request to be the malicious DNS request 401, the verification module 203 may verify the determination result of the machine learning model 202 according to an occurrence frequency (also referred to as a first occurrence frequency) of the malicious DNS request 401.

In an embodiment, the verification module 203 may determine the first occurrence frequency of the malicious DNS request 401 according to a number of occurrences of the malicious DNS request 401 within a certain time range (also referred to as a first time range). The first time range includes a time point at which the malicious DNS request 401 is currently detected.

In an embodiment, the verification module 203 may determine whether the first occurrence frequency is higher than a critical value. If the first occurrence frequency is higher than the critical value, the verification module 203 may determine that the current determination result of the machine learning model 202 determining the target DNS request to be the malicious DNS request 401 is correct. However, if the first occurrence frequency is not higher than the critical value, the verification module 203 may determine that the current determination result of the machine learning model 202 determining the target DNS request to be the malicious DNS request 401 is incorrect. Therefore, the verification module 203 may mark the target DNS request as a misjudgment of the machine learning model 202 determining the malicious DNS request 401. In addition, the verification module 203 may adjust a decision logic of the machine learning model 202 according to this misjudgment. For example, the verification module 203 may adjust the setting of certain weight parameters of the machine learning model 202 according to this misjudgment, in an attempt to reduce the probability of similar misjudgments by the machine learning model 202 in the future.

In an embodiment, the verification module 203 may obtain an occurrence frequency (also referred to as a second occurrence frequency) of the malicious DNS request 401 corresponding to another time range (also referred to as a second time range). For example, the verification module 203 may determine the second occurrence frequency of the malicious DNS request 401 according to the number of occurrences of the malicious DNS request 401 within the second time range. The second time range is different from the first time range, and the second time range does not include the time point at which the malicious DNS request 401 is currently detected. The verification module 203 may determine the critical value according to the second occurrence frequency.

Figure 5:
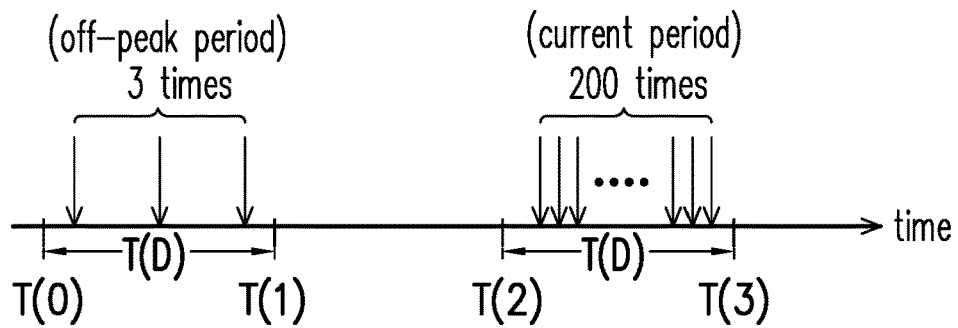
FIG. 5 is a schematic diagram of occurrence frequencies of a malicious domain name system request corresponding to different time ranges according to an embodiment of the disclosure.

FIG. 5 is a schematic diagram of occurrence frequencies of a malicious DNS request corresponding to different time ranges according to an embodiment of the disclosure. With reference to FIG. 5, assuming that the second time range is between time points T(0) and T(1), and the first time range is between time points T(2) and T(3), the first time range includes the time point at which a new malicious DNS request is detected, and the duration of the first time range (i.e., T(D)) is equal to the duration of the second time range (i.e., T(D)).

In an embodiment, the second time range corresponds to an off-peak period. In other words, a number of occurrences of detecting a malicious DNS request is relatively low (for example, 3 times) within the second time range. However, the first time range corresponds to a current period, and the number of occurrences of detecting a malicious DNS request is significantly high (for example, 200 times) within the first time range. In an embodiment, the verification module 203 may determine the critical value according to the number of occurrences of detecting a malicious DNS request (for example, 3 times) within the second time range (or the second occurrence frequency). Thereafter, the verification module 203 may determine whether the first occurrence frequency is higher than the critical value (or the second occurrence frequency). If the first occurrence frequency is higher than the critical value (for example, 200 times of detecting a malicious DNS request in the current period are higher than 3 times), the verification module 203 may determine the determination result that the target DNS request is a malicious DNS request to be correct. On the contrary, if the first occurrence frequency is not higher than the critical value, the verification module 203 may determine the determination result that the target DNS request is a malicious DNS request to be incorrect, and may adjust the machine learning model 202 accordingly.

Figure 6:
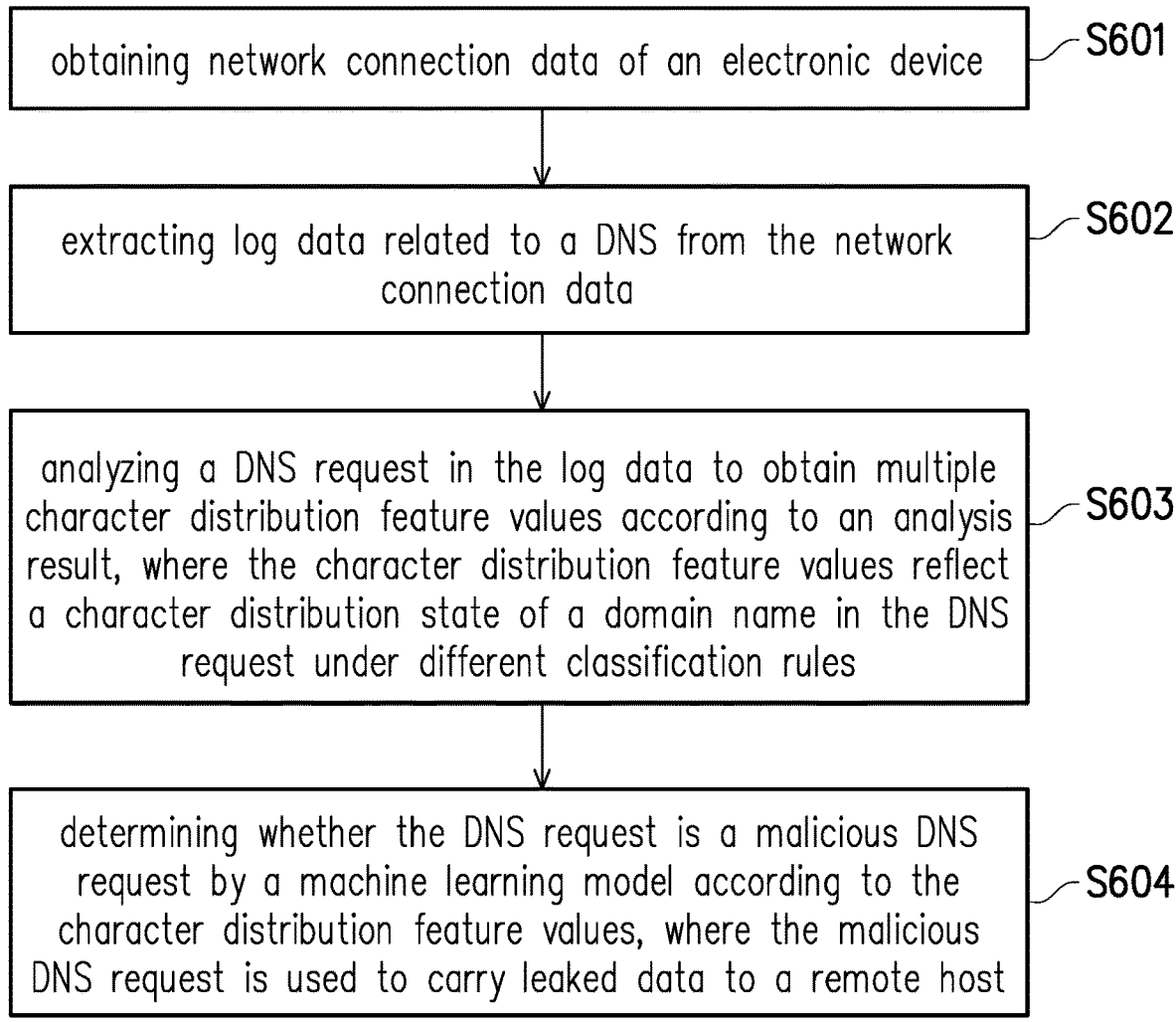
FIG. 6 is a flow chart of an information leakage detection method according to an embodiment of the disclosure.

FIG. 6 is a flow chart of an information leakage detection method according to an embodiment of the disclosure. With reference to FIG. 6, in step S601, network connection data of an electronic device is obtained. In step S602, log data related to a DNS is extracted from the network connection data. In step S603, a DNS request in the log data is analyzed to obtain multiple character distribution feature values according to an analysis result, where the character distribution feature values reflect a character distribution status of a domain name in the DNS request under different classification rules. In step S604, a machine learning model determines whether the DNS request is a malicious DNS request according to the character distribution feature values, where the malicious DNS request is used to carry leaked data to a remote host.

However, each step in FIG. 6 has been described in detail as above, and the same contents are not described herein. It should be noted that each step in FIG. 6 may be implemented by multiple program codes or circuits, and the disclosure is not limited thereto. In addition, the method in FIG. 6 may be used with the above exemplary embodiments or may be used alone, and the disclosure is not limited thereto.

In summary, the exemplary embodiments provided in the disclosure may obtain various character distribution feature values according to the character distribution status of the domain name in the DNS request under different classification rules, and the machine learning model may detect the malicious DNS request that may carry the leaked data according to the various character distribution feature values. In addition, the exemplary embodiments provided in the disclosure may further verify the determination result of the machine learning model based on detection frequency of the malicious DNS requests in different detection periods (for example, off-peak and peak periods). In this way, efficiency of detecting the DNS request and/or the domain name used by a hacker or a malicious program for information leakage may be effectively improved.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An information leakage detection method, comprising:
   obtaining network connection data of an electronic device;
   extracting log data related to a domain name system from the network connection data;
   analyzing a domain name system request in the log data to obtain a plurality of character distribution feature values according to an analysis result, wherein the character distribution feature values reflect a character distribution status of a domain name in the domain name system request under different classification rules; and
   determining whether the domain name system request is a malicious domain name system request by a machine learning model according to the character distribution feature values, wherein the malicious domain name system request is used to carry leaked data to a remote host,
   wherein the character distribution feature values comprise a first type feature value and a second type feature value,
   wherein the first type feature value reflects a first character distribution status of the domain name under a first classification rule, the second type feature value reflects a second character distribution status of the domain name under a second classification rule, and the first classification rule is different from the second classification rule,
   wherein the step of analyzing the domain name system request in the log data to obtain the character distribution feature values according to the analysis result comprises:
   analyzing the domain name system request to obtain a plurality of evaluation parameters; and
   obtaining the character distribution feature values according to the evaluation parameters,
   wherein the evaluation parameters reflect a total number of characters comprised in a string in the domain name, a total number of all characters in the domain name, a total number of numerals in the domain name, a total number of non-repeated characters in a third-level domain name in the domain name, a total number of all characters except a first-level domain name and a second-level domain name in the domain name, a number of appearances of a character appearing most in the third-level domain name in the domain name, a number of occurrences of numerals being adjacent to letters in the third-level domain name in the domain name, a total number of characters meeting a specific condition in the third-level domain name in the domain name, and an entropy value of the third-level domain name in the domain name.

2. The information leakage detection method according to claim 1, further comprising:
   verifying a determination result of the machine learning model according to a first occurrence frequency of the malicious domain name system request corresponding to a first time range after the machine learning model determines that the domain name system request is the malicious domain name system request, wherein the first time range includes a time point at which the malicious domain name system request is currently detected;
   obtaining a second occurrence frequency of the malicious domain name system request corresponding to a second time range, wherein the second time range is different from the first time range, and the second time range does not include the time point at which the malicious domain name system request is currently detected; and
   determining a critical value according to the second occurrence frequency, wherein a step of verifying the determination result of the machine learning model according to the first occurrence frequency of the malicious domain name system request comprises:
marking the domain name system request as a misjudgment of the malicious domain name system request if the first occurrence frequency is not higher than the critical value; and
adjusting a decision logic of the machine learning model according to the misjudgment.

3. The information leakage detection method according to claim 2, further comprising:
determining the first occurrence frequency of the malicious domain name system request according to a number of occurrences of the malicious domain name system request within the first time range.

4. An information leakage detection device, comprising:
a storage circuit, configured to store network connection data and a machine learning model of an electronic device; and
a processor, coupled to the storage circuit and configured to:
extract log data related to a domain name system from the network connection data;
analyze a domain name system request in the log data to obtain a plurality of character distribution feature values according to an analysis result, wherein the character distribution feature values reflect a character distribution status of a domain name in the domain name system request under different classification rules; and
determine whether the domain name system request is a malicious domain name system request by the machine learning model according to the character distribution feature values, wherein the malicious domain name system request is used to carry leaked data to a remote host
wherein the character distribution feature values comprise a first type feature value and a second type feature value,
wherein the first type feature value reflects a first character distribution status of the domain name under a first classification rule, the second type feature value reflects a second character distribution status of the domain name under a second classification rule, and the first classification rule is different from the second classification rule,
wherein an operation of analyzing the domain name system request in the log data to obtain the character distribution feature values according to the analysis result comprises:
analyzing the domain name system request to obtain a plurality of evaluation parameters; and
obtaining the character distribution feature values according to the evaluation parameters,
wherein the evaluation parameters reflect a total number of characters comprised in a string in the domain name, a total number of all characters in the domain name, a total number of numerals in the domain name, a total number of non-repeated characters in a third-level domain name in the domain name, a total number of all characters except a first-level domain name and a second-level domain name in the domain name, a number of appearances of a character appearing most in the third-level domain name in the domain name, a number of occurrences of numerals being adjacent to letters in the third-level domain name in the domain name, a total number of characters meeting a specific condition in the third-level domain name in the domain name, and an entropy value of the third-level domain name in the domain name.

5. The information leakage detection device according to claim 4, wherein the processor is further configured to:
verify a determination result of the machine learning model according to a first occurrence frequency of the malicious domain name system request corresponding to a first time range after the machine learning model determines that the domain name system request is the malicious domain name system request, wherein the first time range includes a time point at which the malicious domain name system request is currently detected;
obtain a second occurrence frequency of the malicious domain name system request corresponding to a second time range, wherein the second time range is different from the first time range, and the second time range does not include the time point at which the malicious domain name system request is currently detected; and
determine a critical value according to the second occurrence frequency,
wherein an operation of verifying the determination result of the machine learning model according to the first occurrence frequency of the malicious domain name system request comprises:
marking the domain name system request as a misjudgment of the malicious domain name system request if the first occurrence frequency is not higher than the critical value; and
adjusting a decision logic of the machine learning model according to the misjudgment.

6. The information leakage detection device according to claim 5, wherein the processor is further configured to:
determine the first occurrence frequency of the malicious domain name system request according to a number of occurrences of the malicious domain name system request within the first time range.

* * * * *